United States Patent [19]

Koning

[11] Patent Number: 4,793,195

[45] Date of Patent: Dec. 27, 1988

[54] VIBRATING CYLINDER GYROSCOPE AND METHOD

[75] Inventor: Menno G. Koning, Dover, Mass.

[73] Assignee: Northrop Corporation, Hawthorne, Calif.

[21] Appl. No.: 920,743

[22] Filed: Oct. 20, 1986

[51] Int. Cl.⁴ .................. G01C 19/28; G01C 19/56
[52] U.S. Cl. ................... 74/5.6 D; 73/505; 74/5 R
[58] Field of Search ............ 73/505, 517 AV, 688, 73/DIG. 1; 74/5.6 D, 5 R

[56] References Cited

U.S. PATENT DOCUMENTS

| | | | |
|---|---|---|---|
| 3,145,572 | 8/1964 | Brindley | 73/505 |
| 3,177,727 | 4/1965 | Douglas | 73/505 |
| 3,182,512 | 5/1965 | Jones et al. | 73/505 |
| 3,408,872 | 11/1968 | Simmons et al. | 73/505 |
| 3,429,188 | 2/1969 | Buckley et al. | 73/505 |
| 3,656,354 | 4/1972 | Lynch | 73/505 |
| 3,719,074 | 3/1973 | Lynch | 73/505 |
| 3,813,934 | 6/1974 | Meyer | 73/DIG. 1 |
| 3,924,475 | 12/1975 | Stiles | 73/517 AV X |
| 4,644,793 | 2/1987 | Church | 73/505 |

*Primary Examiner*—Rodney H. Bonck
*Attorney, Agent, or Firm*—Terry J. Anderson; Robert B. Block

[57] ABSTRACT

The gyroscope includes a symmetric and concentric, freely vibrating cylinder. Electromagnetic forcers are arranged to apply forces on the cylinder to excite the cylinder's lowest order radially oscillating mode. The forcers also steer the resulting nodal pattern of the cylinder. The cylinder nodal pattern is sensed and a servo selectively excites the forcers to steer the nodal pattern to its original configuration in the presence of cylinder rotations. The forcer steering commands are related to the rotation rate of the gyro. The vibrating cylinder is free of any attachments or deposits and is machined accurately to eliminate the need for balancing, resulting in low temperature sensitivity.

8 Claims, 6 Drawing Sheets

$$\sin^2 \beta = \frac{b^2 \cdot \sin^2 \gamma}{a^2 + b^2 - 2ab \cos \gamma}$$

$$\gamma = 180 - 22\tfrac{1}{2}°$$

$$\sin \beta = \left( \frac{b^2 \cdot \sin^2 22\tfrac{1}{2}°}{a^2 + b^2 + 2ab \cos 22\tfrac{1}{2}°} \right)^{1/2}$$

VIBRATING CYLINDER GYROSCOPE AND METHOD

BACKGROUND OF THE INVENTION

This invention relates to angular rate sensors and more particularly to a vibrating cylinder gyroscope.

The vibrating cylinder gyroscope (VCG) found its origin in a scientific paper in the Proceedings of the Royal Society in London by G. H. Bryan in 1890, "On a Revolving Cylinder or Bell," Proc. Roy. Soc. London Vol. 47 (1890) pp. 101-111. This paper investigated the behavior of nodal points in a vibrating cylinder when rotated about its axis. Subsequently, much research and development has taken place on this type of rotation sensor, which has the potential advantage, when compared with conventional high-speed rotor gyroscopes, of being of much reduced mechanical complexity and hence cost and of increased ruggedness and life. A description of VCG operation is given in a paper by C. H. J. Fox and D. J. W. Hardie, "Vibratory Gyroscopic Sensors," DGON Symposium, Stuttgart, 1984. Basically, a thin-walled cylinder is made to oscillate radially at its lowest mode at its natural frequency. As will be discussed in more detail below, there are two nodal diameters for this simplest mode (n=2). The deflected form of the cylinder is basically elliptical and the vibration pattern is stationary when the cylinder is not rotated. When the cylinder is rotated about its axis, however, Coriolis forces act on the cylinder walls causing the vibration pattern to change its orientation in a direction opposite to that of the imparted rotation. If the cylinder rotates through an angle $\phi$, the pattern, with its nodal points, rotates through an angle of approximately 3/5 $\phi$. This principle forms the basis of a vibrating cylinder rotation sensor. A rate integrating gyro results from measuring these nodal shifts.

Much work has been done on the vibrating cylinder gyroscope including work by Sperry, Kearfott and others. Two developments, the Hemispheric Resonator Gyro (HRG) by Delco and the Solid State Angular Rate Transducer (START) by GEC Avionics have reached a phase where the practicability of the principles has been demonstrated. A heightened interest in the VCG has now been created by the need for a small, low-cost and rugged rate sensor to be used in inertially guided projectiles. For these applications, the sensor must be capable of surviving linear accelerations up to 16,000 g's and rotational accelerations up to 247,000 rad/s$^2$. The sensor must have a full scale range of $\pm 500°$/s, an overall accuracy, inclusive of threshold, resolution and hysteresis of 0.01°/s and a ready time of less than 0.05 seconds. The sensor should also be small, having a size not exceeding three cubic inches.

Vibrating cylinder gyros, though simple, have not found wide usage because they cannot easily be made to meet performance requirements. Important practical problems must be overcome particularly in relation to the characteristics of the cylinder. Even in a theoretically perfect and optimum ring with a wall thickness that can be ignored with respect to the ring diameter, some error will occur due to centrifugal terms when the natural frequency of the cylinder is too low with respect to the applied rotation rate of the cylinder. The method of supporting the cylinder to a reference frame, the homogeneity of its material, the damping characteristics of the material, the degree of symmetry and the degree of thermal equilibrium are factors that affect the node locations of the cylinder, and therefore, the response of the vibrating cylinder gyroscope. In addition, the apparatus for exciting the cylinder at its natural frequency and detecting the nodal points must be extremely symmetrical and stable. Test data published by Delco with an instrument made of fused quartz indicate drift errors as low as 0.01°/h when thermally modeled and 1°/h when unmodeled. The scale factor accuracy is better than 1 ppm. The initial data published by GEC Avionics with a resonator ring made of metal indicate drift errors of approximately 0.1°/s and a scale factor linearity of better than 0.25%. The dispersion in accuracy between the two known instruments is ascribed to the vastly different level of sophistication, complexity, and thus cost, by which the instruments are built. A conservative performance estimate of a low-cost VCG made of metal (which is much less expensive and more rugged than quartz) would be as follows:

Drift Error: 50°/h
Scale Factor Accuracy: 0.1% of full scale
Range: $\pm 500°$/s An object of the present invention, therefore, is a vibrating cylinder gyroscope which is relatively accurate, low-cost, rugged and having a long life time.

Yet another object of the invention is a VCG having a freely vibrating cylinder free of any attachments or deposits and machined accurately to eliminate the need for balancing.

SUMMARY OF THE INVENTION

These and other objects of the invention are achieved in a vibrating cylinder gyro having a vibrating cylinder and electromagnetic forcers arranged to apply forces on the cylinder to excite its lowest order radially oscillating mode and to steer the resulting nodal pattern. Apparatus is provided for sensing the nodal pattern and a servo system selectively controls the forcers to steer the nodal pattern to its original configuration in the presence of cylinder rotations. The steering commands are related to the rotation rate of the vibrating cylinder. In a preferred embodiment, the nodal pattern is sensed by capacitive pickoffs. The pickoffs may also be electromagnetic.

BRIEF DESCRIPTION OF THE DRAWING

The invention disclosed herein will be understood better with reference to the drawing of which:

FIG. 2B is a plan view of the gyro of FIG. 2a;

DESCRIPTION OF THE PREFERRED EMBODIMENT

Figure 1:
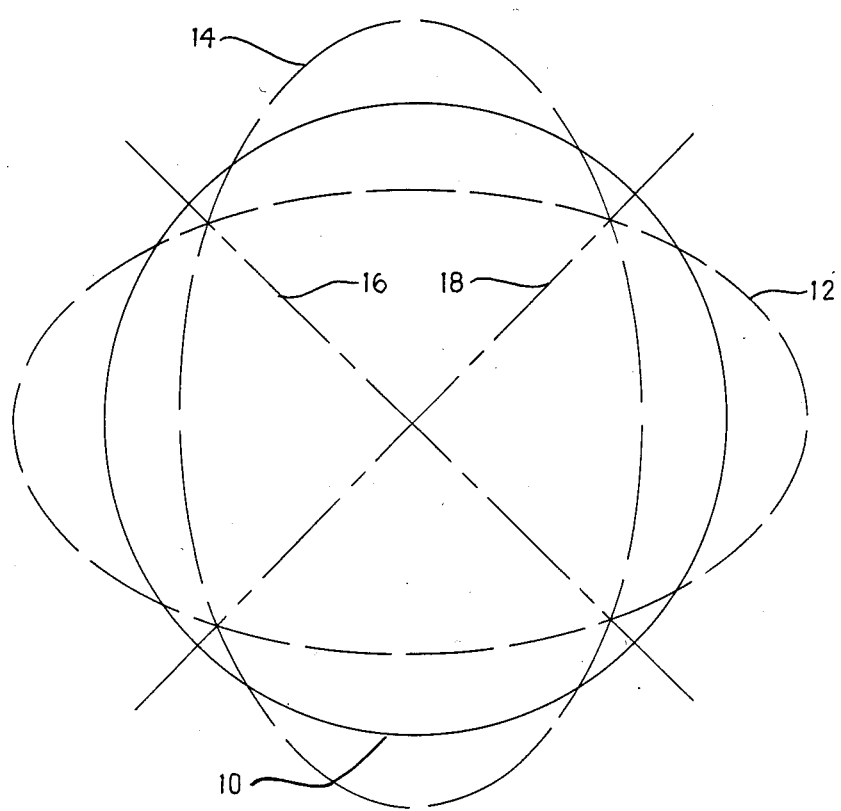
FIG. 1 is a schematic representation of a vibrating cylinder.

As stated above, a vibrating cylinder gyro employs a thin-walled cylinder which is mounted on a moving, i.e. rotating, platform or body (not shown) and is made to oscillate radially at its lowest mode at its natural frequency. As shown in FIG. 1, a cylinder 10 becomes deformed into the elliptical shapes 12 and 14 with two nodal diameters 16 and 18. The vibration pattern in this simplest mode (n=2) remains stationary when the cylinder is not rotated. For a perfectly axially symmetric cylinder, the position of the vibration pattern depends on the way the free vibration is first initiated. The natural frequency is given by $$w_n^2 = .66 \frac{Eh^2}{\rho R^4}$$

assuming a poisson's ratio of 0.3 (for ferrous materials). Also as stated above, as the cylinder 10 rotates, Coriolis forces act on the cylinder walls causing the vibration pattern to change its orientation in a direction opposite from the rotation imparted to the cylinder. In particular, if the cylinder rotates through an angle $\phi$, the pattern, with its nodal points, rotates through an angle of approximately $3/5\phi$.

Figure 2A:
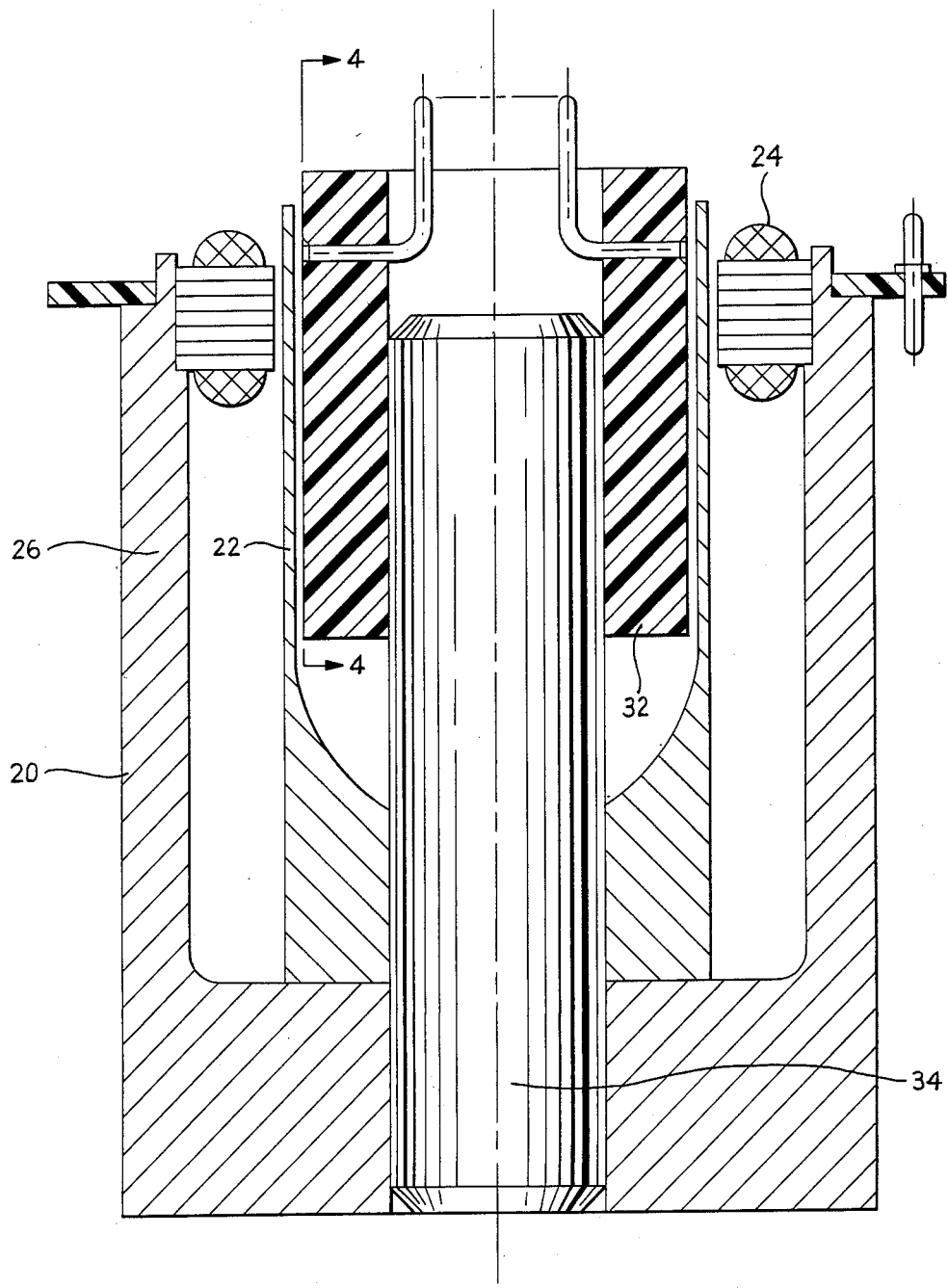
FIG. 2A is a cross-sectional view of an experimental model of a vibrating cylinder gyro.
Figure 2B:
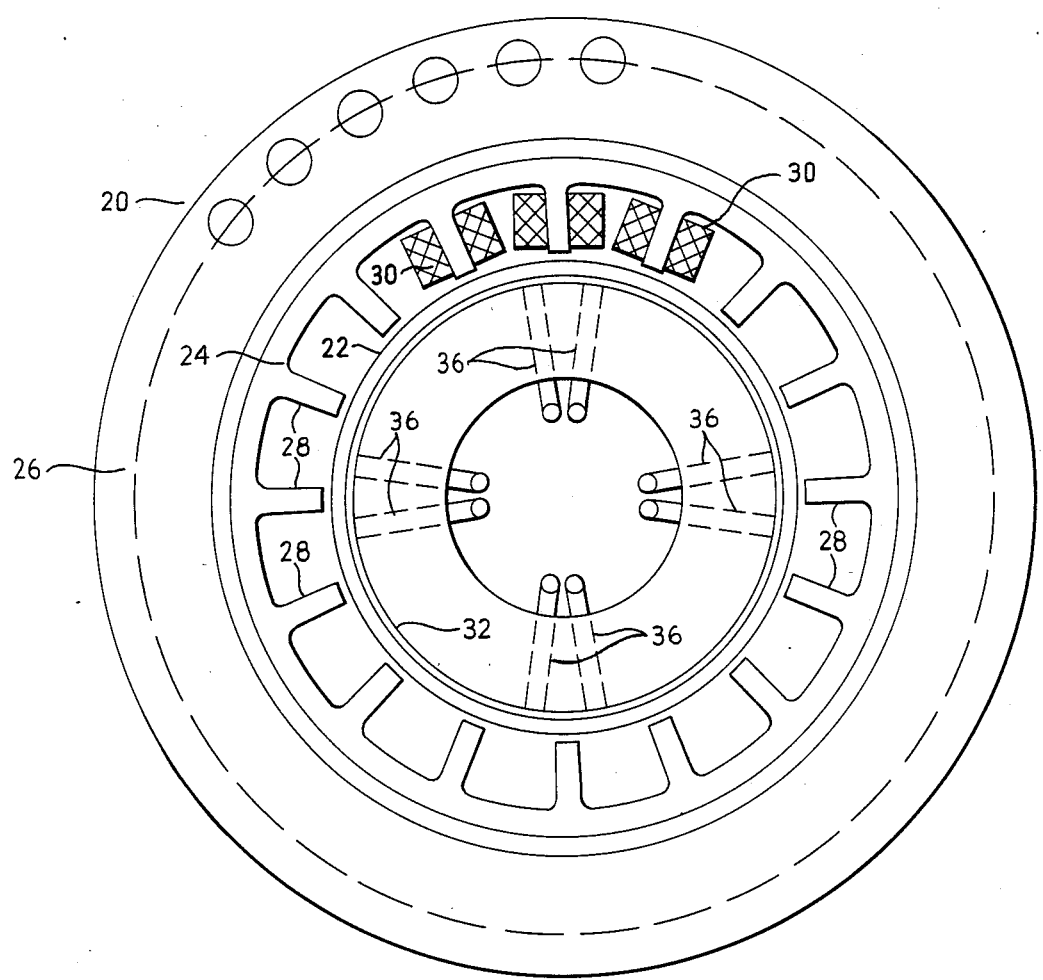

FIGS. 2A and 2B show an experimental version of the vibrating cylinder gyro disclosed herein. A gyro 20 is mounted on a platform (not shown) and includes a cylindrical resonator 22 made of Ketos tool steel, properly hardened and stress relieved. The resonating cylinder 22 is caused to resonate with magnetic attraction forces generated from a multiple pole electromagnetic force (forcer) 24 which is located outside of the cylinder 22 and mounted on a structure or platform 26. The force transducer 24 is made of laminated Carpenter 49 material. In this embodiment, sixteen teeth 28 with individual coils 30 wound around each tooth form sixteen individual forcers.

Figure 4:
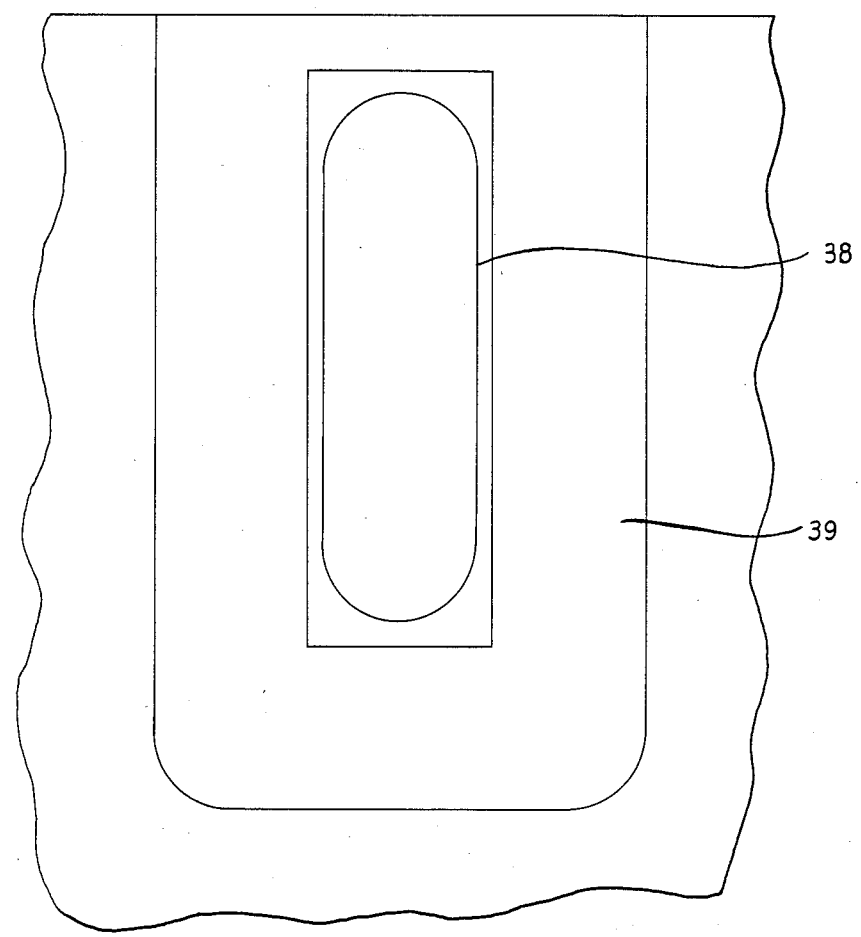
FIG. 4 is an elevational view of a capacitance plate and associated guard used in the present invention.

The detection of the nodal points in the vibration pattern is accomplished with capacitance pickoffs located on a macor cylinder 32 which is positioned inside the resonator 22. The resonator cylinder 22, the electromagnetic forcer support structure 26 and the macor cylinder 32 are all mounted on a support stem 34. In this embodiment, four capacitors are utilized with terminals 36. As shown in FIG. 4, each capacitance plate 38 is surrounded by a guard 39 which is kept at the same potential as the capacitor plate 38 to prevent the effects of external fields. The capacitors are 2 pF each and are located at the nodal points, 90° apart. Preamplifiers (not shown) are located in close proximity to the capacitors to minimize spurious stray inputs.

Figure 3:
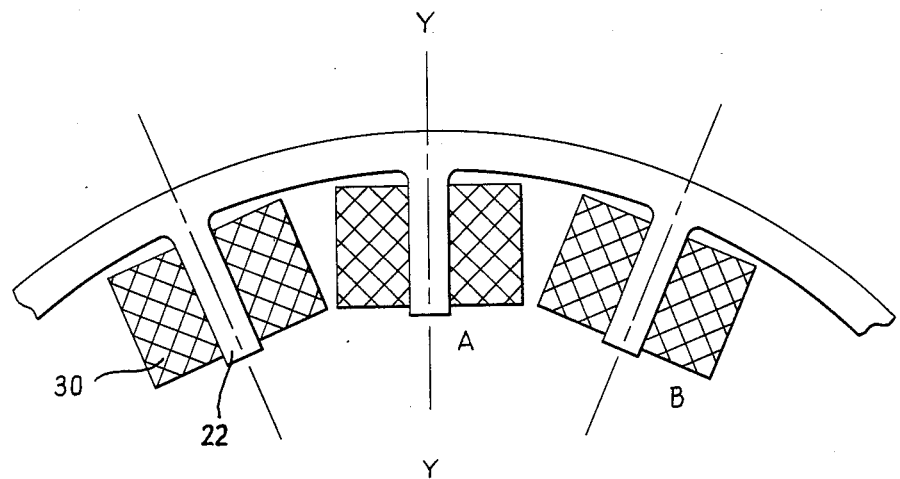
FIG. 3 is a graphical illustration of the vector sum of attraction forces of the electromagnetic forcers.
Figure 3:
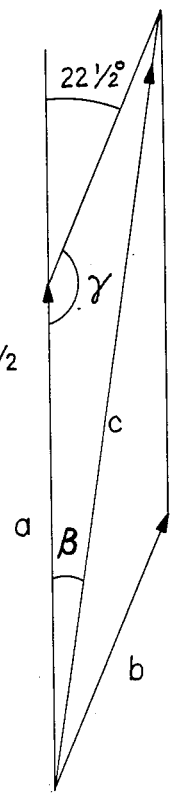

The electromagnetic forcers 24 are electrically excited at ½ the natural resonator frequency and are interconnected to provide any desired location of the nodal pattern on the resonator. With reference to FIG. 3, when a forcer A is excited the antinodal point (e.g., the location of maximum deflection) will lie along the Y—Y axis. When both forcers A and B are excited with equal current the antinodal point will shift to a location 11°–15' clockwise from the Y—Y axis since poles A and B ate at the 22°–30' location. Furthermore, if the magnitudes of the currents in the coils A and B are made to be non-alike, the shift of the antinodal point depends on these current magnitudes. The vector sum of the attraction forces a and b by forcers A and B determines the location of the antinodal point. From FIG. 3 it can be seen that the angle $\beta$ is given by $$\sin \beta = \left( \frac{b^2 \sin^2 22\frac{1}{2}°}{a^2 + b^2 + 2ab \cos 22\frac{1}{2}°} \right)^{\frac{1}{2}}$$

and since the forcers A and B are quadratically proportional to the currents in A and B the angle $\beta$ is given by $$\sin \beta = K_1 \left( \frac{i_b^4}{i_a^4 + i_b^4 + K_2 i_a^2 i_b^2} \right)^{\frac{1}{2}}$$

In general, by regulating currents in any of the sixteen individual forcers, the vibration patterns may be controlled to any location. This principle may be used for an implementation in which any shift in nodal points caused by rotation of the cylinder is detected and driven back t its original location by selectively applying currents in the plural forcers. An external servo control loop (shown in FIG. 5) can accomplish this. Another method to control the location of the vibration pattern is by appropriate application of current pulses in selected forcers at a frequency of ½ the natural resonator frequency. This mode of operation would be analogous to a pulse-width-modulation servo control used in conventional gyro applications and gives the advantage of a digital output.

Figure 5:
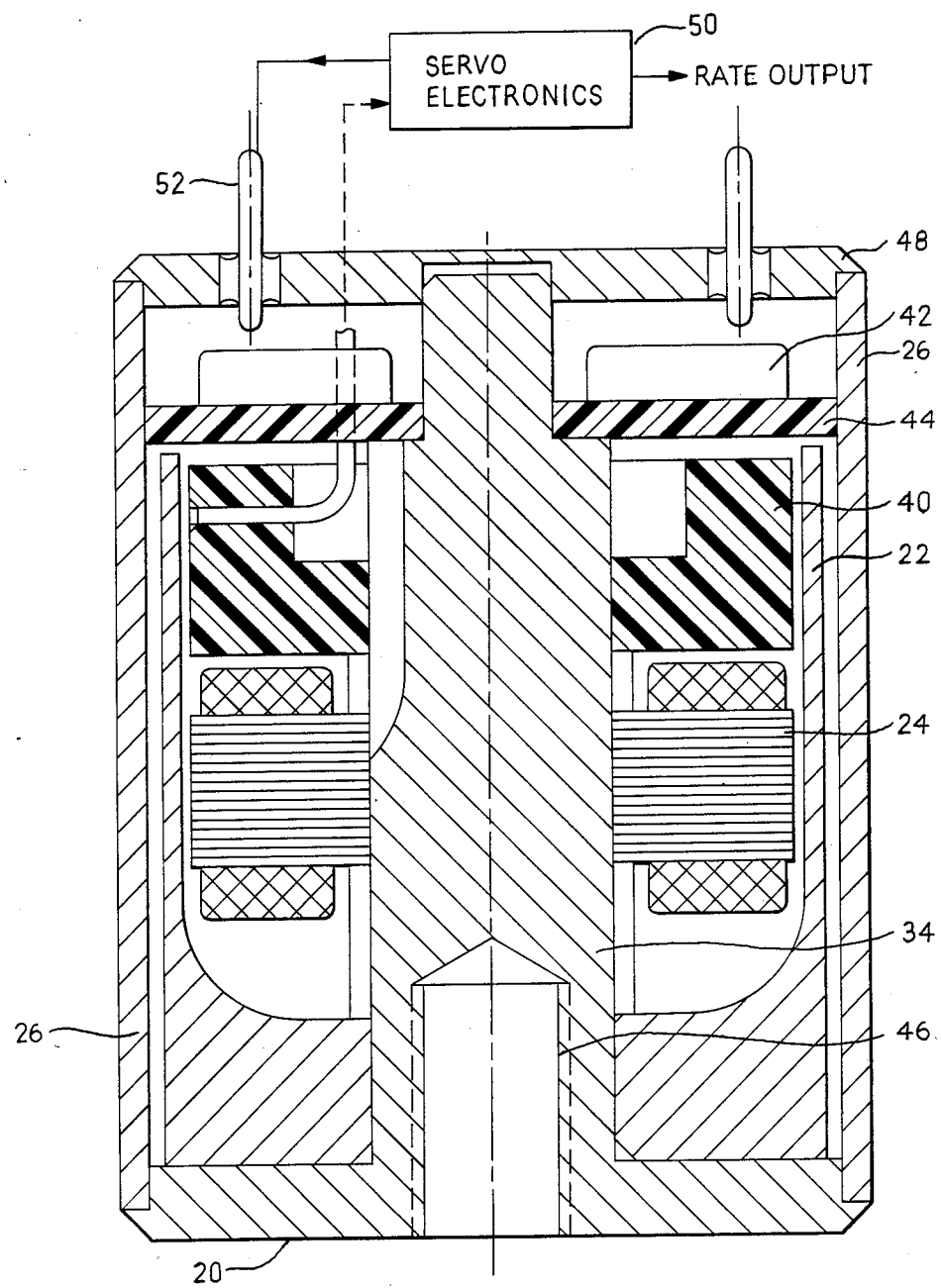
FIG. 5 is a cross-sectional view of the vibrating cylinder gyroscope disclosed herein.

A preferred embodiment of the present invention is shown in FIG. 5. In this embodiment both capacitive or reluctance pickoffs 40 and the electromagnetic forcers 24 are located inside the resonating cylinder 22. This arrangement facilitates coil insertion and makes the overall instrument smaller than in the embodiment of FIGS. 2a and 2b. Preamplifiers 42 are located on PC boards 44 which are in close proximity to the capacitive pickoffs 40 to minimize spurious stray inputs. The support stem 34 has a mounting thread 46 so that the gyro may be securely mounted. A terminal header 48 completes the instrument.

The operation of the vibrating cylinder-gyro as shown in FIG. 5 will now be described. The electromagnetic forcers 24 establish a vibration pattern in the resonating cylinder 22. The capacitance pickoffs 40 detect the nodal point locations on the cylinder 22 and communicate these nodal point locations to a servo electronics block 50. Upon gyro rotation, the servo block 50 selectively excites the electromagnetic forcers 24 through a terminal 52 to drive the nodal points back to their original location. The phase of the output signals from the capacitive pickoffs 40 with respect to the drive signal indicates the direction of rotation of the gyro 20. The block 50 also generates a signal proportional to the angular rate of the gyro 20 which is related to the manner in which the electromagnetic forcers 24 are selectively excited in order to maintain the nodal pattern at its null position. The block 50 may also include a negative feedback loop to give a minimum response time and phase-lock drive circuits to maintain the drive frequency at the natural frequency which varies with temperature. Because care is taken during machining to make the resonator 22 as symmetric as is reasonably possible, there is no need for symmetrical balancing of the resonator 22.

It is thus seen that the objects of this invention have been achieved in that there has been disclosed a vibrating cylinder gyro for sensing angular rate. The gyro includes electromagnetic forcers for exciting the resonator and capacitive or reluctance pickoffs for monitoring the location of nodal points of the resulting vibrational pattern. The location of the nodal points is adjusted by selective excitation of the electromagnetic forcer coils. In particular, this selective excitation of the forcer coils maintains the nodal points at a null location during rotation of the gyro. The selective excitation of the forcer coils becomes an indication of the gyro angular rate. The cylinder resonator is free of any attachments or deposits and is machined accurately to eliminate the need for balancing, resulting in low temperature sensitivity. The resulting instrument is compact and rugged. It is recognized that modifications and variations of the present invention will occur to those skilled in the art and it is intended that all such modifications and variations be included within the scope of the appended claims.

What is claimed is:

1. Vibrating cylinder gyro comprising:
   a cylinder;
   electromagnetic forcers arranged to apply forces on the cylinder to excite its lowest order radially oscillating mode and to steer the resulting nodal pattern;
   means for sensing the nodal pattern; and
   servo means for controlling the forcers to steer the nodal pattern to its original configuration in the presence of cylinder rotations, the steering commands being related to rotation rate.

2. The gyro of claim 1 in which the cylinder is symmetric and concentric and free of any attachments or deposits.

3. The gyro of claim 1 further including a negative feedback loop to give minimum response time.

4. The gyro of claim 1 further including phase-locked drive circuits to maintain the drive frequency at the natural frequency to compensate for temperature variations.

5. The gyro of claim 1 in which the means for sensing the nodal pattern comprises capacitance or reluctance pickoffs.

6. Vibrating cylinder gyro comprising:
   a ferromagnetic cylinder
   electromagnetic forcers located inside the cylinder arranged to apply forces on the cylinder to excite its lowest order radially oscillating mode and to steer the resulting nodal pattern;
   capacitance or reluctance pickoffs for sensing the nodal pattern; and
   closed loop servo means for selectively exciting the forcers to steer the nodal pattern to an original configuration in the presence of cylinder rotations, the selective excitation being related to rotation rate.

7. A vibrating cylinder gyro for measuring angular rotation of a rotating platform comprising
   a cylindrical shell mounted to the platform for movement therewith, said shell having an open end extending away from the platform, said end being free to resonate,
   electrical transducer and drive current circuit means for exciting the shell to produce low order radial oscillations with nodes of vibration which move in response to rotational movement of the platform and shell,
   pickoff means mounted to the platform and free of the shell for sensing movement of the nodes of vibration,
   a servo loop means responsive to said pickoff means for regulating the electrical transducer current to move the nodes of vibration back to an original, unrotated position to thereby define a restore electrical current magnitude and phase, the values of which indicate the amount and direction or rotation of said platform and gyro.

8. In a method for measuring angular rotation of a rotating platform with a vibrating cylinder gyro including
   a cylindrical shell mounted to the platform for movement therewith, said shell having an open end extending away from the platform, said end being free to resonate,
   exciting the shell with an electrical transducer and drive current circuit means to produce low order radial oscillations with nodes of vibration which move in response to rotational movement of the platform and shell,
   sensing movement of the nodes of vibration with pickoff means,
   regulating the electrical transducer current with a servo loop means responsive to said pickoff means to move the nodes or vibration back to an original, unrotated position to thereby define a restore electrical current magnitude and phase, the values of which indicate the amount of rotation of said platform and gyro.

* * * * *